No. 719,617. PATENTED FEB. 3, 1903.
J. P. SCOVILL.
APPARATUS FOR PEELING TOMATOES, &c.
APPLICATION FILED SEPT. 6, 1901.
NO MODEL.
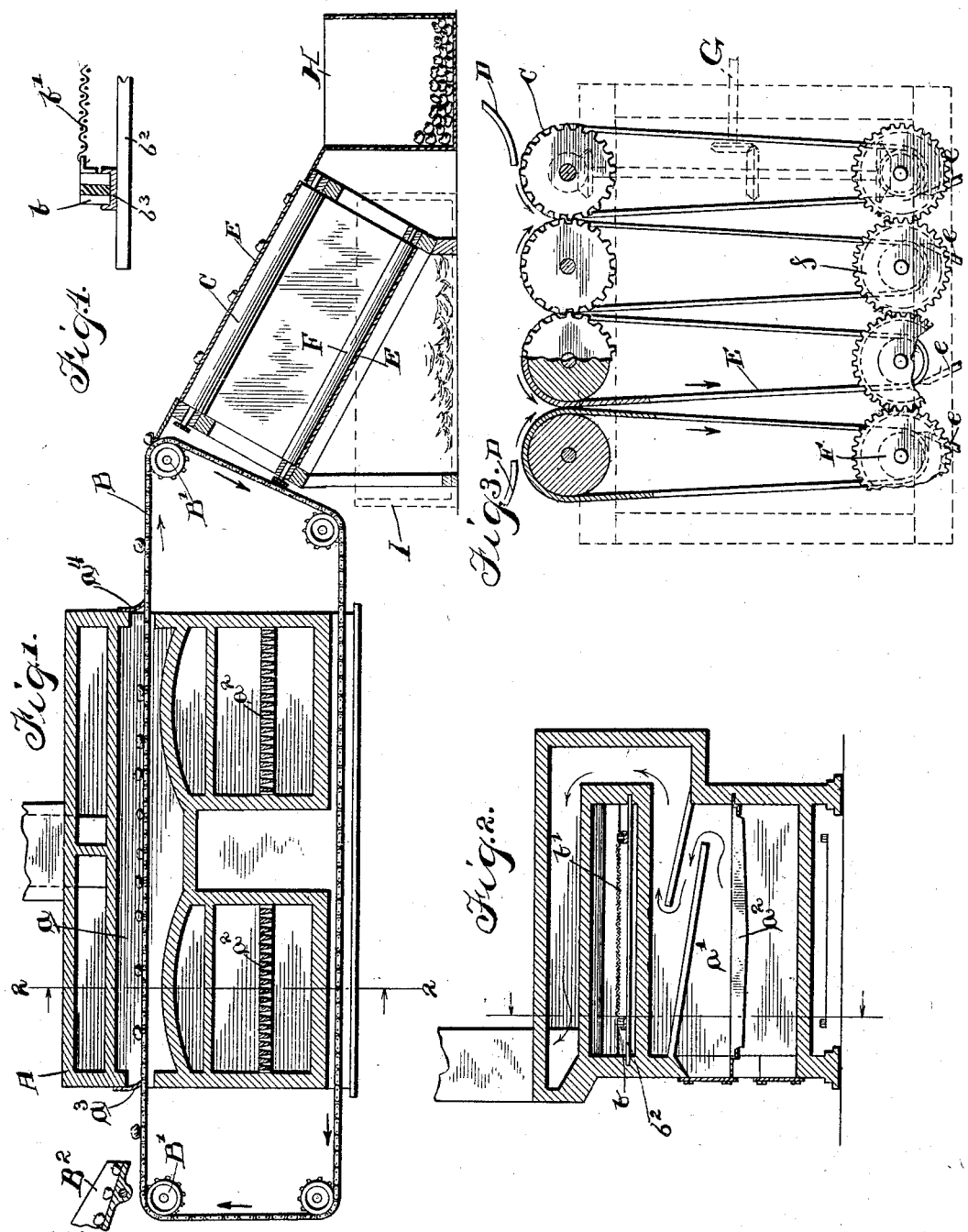
Witnesses:
J B Weir
Ira D. Perry
Inventor
Jas. P. Scovill.

UNITED STATES PATENT OFFICE.

JAMES P. SCOVILL, OF CHICAGO, ILLINOIS.

APPARATUS FOR PEELING TOMATOES, &c.

SPECIFICATION forming part of Letters Patent No. 719,617, dated February 3, 1903.

Application filed September 6, 1901. Serial No. 74,568. (No model.)

*To all whom it may concern:*

Be it known that I, JAMES P. SCOVILL, a citizen of the United States, residing at Chicago, in the county of Cook and State of Illinois, have invented certain new and useful Improvements in Machines for Peeling Tomatoes, &c., of which the following is a specification.

In a copending application, serially numbered 74,566, I have described and claimed an improved process of peeling tomatoes and the like which involves the blistering of the fruit by subjecting it for a short time to a dry heat of exceedingly high temperature for the purpose of loosening the skin, so as to permit of its being readily separated therefrom.

The present invention relates to an improved apparatus for peeling tomatoes in the manner contemplated by this process; and it comprises both an oven by which the fruit can be blistered as described and a peeling-machine by which the blistered fruit taken from the oven can be stripped of its skin without the necessity of any hand work or manipulation.

In its approved form herein shown the oven is designed to carry on the blistering of the fruit as a continuous process, and to this end includes, in connection with a heating-chamber, an endless apron passing through the chamber and designed to be moved at such a rate of speed as will subject the fruit to the high temperature of the oven during an interval of time just long enough to perfectly accomplish the desired blistering without heating the body of the fruit at all or at least without heating it sufficiently to alter its proper normal and firm condition. The tomatoes will be placed upon the entering side of such endless carrier-apron by hand or by any suitable automatic or other feed mechanism and after leaving the furnace will be automatically discharged from said apron upon the peeling-machine. This latter portion of my improvements consists, essentially, of one or more pairs of peeling-rolls geared to rotate together in close proximity and desirably made of a diameter rather less than the average diameter of the fruit itself, such rolls being longitudinally inclined downward from a point adjacent to the carrier-apron, so that the fruit discharged upon the rolls from the apron will gradually make its way along the rolls, subject continually to their rubbing and rotating action, until it is finally discharged at their lower ends completely stripped of its skin and in a perfectly-peeled condition.

The invention consists in the matters herein set forth, and particularly pointed out in the appended claim, and will be fully understood from the description of the construction illustrated in the accompanying drawings, in which—

Figure 1 is a longitudinal sectional elevation of a tomato-peeling apparatus embodying my improvements in one form. Fig. 2 is a transverse sectional elevation taken through the blistering-oven on line 2 2 of Fig. 1. Fig. 3 is a transverse section of the peeling-machine. Fig. 4 is a sectional detail of the carrier-apron.

The blistering-oven A in said drawings may be of any desired or suitable construction by which an elongated chamber $a$ can be continuously maintained at a high temperature—of 1,000°, more or less, for example. This furnace may be heated by gas or oil fuel, but is herein shown as provided with combustion-chambers $a'$, within which coal or the like is designed to be burned upon grates $a^2$ in a familiar manner. Extending through the blistering-chamber $a$ is a traveling apron B, of any suitable non-combustible construction, consisting, as herein shown, of marginal sprocket-chains $b$, connected by an endless woven or linked wire fabric $b'$. The sprocket-chains may be guided by channel-irons $b^3$, resting upon a supporting plate or floor $b^2$ in the oven, as shown in Figs. 2 and 3, or they may be supported simply by their tension, as in Fig. 1. These sprocket-chains $b$ pass around sprocket-wheels B', one or more of which are positively rotated by connections not herein illustrated to give continuous movement to the apron. The outlet and inlet openings of the blistering-chamber are, with a view to largely preventing the escape of heat, made as narrow as is compatible with the passage of the fruit, and they are herein shown as normally closed by flexible flaps $a^3$ and $a^4$, of asbestos or the like, which will readily yield to permit the fruit to pass under them and then immediately drop over the openings. Tomatoes will be laid upon the entering side of the apron by hand or by any suitable shaking-table or other feed mechanism B², the exact nature of which is not of importance so long as it delivers the fruit to the apron so gradually as to scatter it thereon, so that as the apron passes through the oven each piece will be exposed on all sides to the heated atmosphere.

It will be observed that the hot-air blistering-chamber is isolated from the products of combustion, so that during the blistering operation the products of combustion will be prevented from coming into contact with the fruit, and that the approximately horizontal stretch of the traveling carrier passes through the clear space of the chamber—that is, above and out of contact with the bottom thereof—so that not only shall the hot air circulate freely around the fruit, but also that the fruit shall be prevented from burning.

As the carrier-apron B passes over the upper rear sprocket-wheels B' the fruit upon it is discharged upon a peeling-machine, which according to my present improvements comprises, essentially, one or more pairs of rolls C, that are mounted in parallel relation to each other in close proximity and are rotated so that their proximate sides turn downwardly toward each other. These rolls are not of sufficiently large diameter to permit the fruit being caught and crushed between them, but by their rubbing action serve to strip off the blistered and loosened skin of the fruit, so as to leave its peeled body practically intact. A diameter of from one to one and one-half inches has proved to be satisfactory for this purpose; but it will be understood that the invention is not limited to any particular diameter of roll so long as they are capable of accomplishing the peeling operation without injuring the body of the fruit. As herein shown, two pairs of rolls C are provided, and the several rolls are caused to rotate together in proper directions by intermeshing gears c, which are rigidly secured to the rolls. The number of rolls employed is not of importance so long as a sufficient rubbing-surface is provided to properly strip all the fruit discharged from the apron B, guide-boards D being provided on the outer side of each outermost roll to direct the fruit inwardly upon the rolls. To prevent the skins thus stripped from the tomatoes from wrapping themselves about the rolls, and thus rendering the rolls slippery and inoperative, suitable stripping devices are provided, consisting in this instance of traveling aprons E, each of which passes around one of the rolls C and around a guide-roll F beneath. These guide-rolls are desirably made of less diameter than the main rolls C in order that the aprons may diverge and release the peelings as they pass downwardly from between the rolls C, and stripping-plates e are herein shown as provided adjacent to the lower rolls F to scrape from the ns such peelings as may adhere to either of them. In order to prevent any tendency for the aprons to slip, the guide-rolls F, as well as the rolls C, will preferably be positively rotated, and they are herein shown as provided with rigidly-attached intermeshing gears f, similar to the gears c of the rolls C. Any suitable gearing G may be provided for driving the two sets of rolls; but its particular construction is not of importance herein.

The feeding of the fruit along the rolls C is herein shown as accomplished by inclining the rolls longitudinally downward from the apron, so that the weight of the fruit will cause it to gradually work its way along the rolls toward their lower end, from which it will fall upon or into any suitable receiver, shown in this instance as a tank or receptacle H. Such inclination of the rolls must not be so great as to permit the fruit to roll down more rapidly than is compatible with its being properly peeled by the rolls, but will be great enough to keep the fruit moving along the rolls as fast as it is discharged upon them from the oven.

In the operation of the apparatus thus described it is contemplated that each tomato will have its stem portion removed or cut away either by hand or preferably by any suitable rotary mill or cutter; but this is the only handling which is contemplated will be necessary during the entire peeling operation. The fruit with its stem portions thus cut away will be fed upon the entering side of the apron, as described, and will pass through the blistering-chamber exposed on all sides to the highly-heated atmosphere thereof, so that when it emerges from the chamber its skin at all points will be thoroughly blistered and loosened, the time required for the passage of each tomato through the oven being, however, so short as to prevent the body of the fruit from becoming cooked or softened in any noticeable degree. From the apron B the fruit will pass off upon the rolls C and will gradually work its way down in the grooves or channels between the rolls until it is discharged from their lower ends in a completely-peeled condition, the rotation of the rolls, together with their longitudinal inclination, serving to keep the fruit constantly twirling and turning, so that a sufficiently large portion of its surface will come in contact with the rolls, or rather with the aprons E which cover the rolls, to enable every particle of the blistered skin to be torn away, the skin thus removed passing down between the rolls and being discharged into any suitable receptacle I beneath.

It will be understood that various changes may be made in the details of the construction shown without departure from the broad spirit of the invention claimed.

I claim as my invention—

In an apparatus for blistering tomatoes preparatory to removing the skin, the combination of a furnace formed with a fire-chamber and a hot-air chamber isolated from the products of combustion, an endless carrier having a perforate surface adapted to support the fruit and to permit the free circulation of hot air through it and having a horizontal stretch passing through said hot-air chamber above and out of contact with the bottom thereof, and means outside the hot-air chamber to which said carrier immediately delivers the heated fruit for peeling it.

In testimony that I claim the foregoing as my invention I affix my signature, in presence of two subscribing witnesses, this 12th day of August, A. D. 1901.

J. P. SCOVILL.

Witnesses:
HATTIE E. RANDELL,
JAMES D. JARVIS.